United States Patent
Gazda et al.

(10) Patent No.: US 12,307,329 B2
(45) Date of Patent: May 20, 2025

(54) COMPILATION TECHNIQUE FOR SURFACE CODE ARCHITECTURE

(71) Applicant: BULL SAS, Les Clayes sous Bois (FR)

(72) Inventors: Arnaud Gazda, Versailles (FR); Simon Martiel, Versailles (FR); Jon Oillarburu, Saint Martin d'Arberoue (FR)

(73) Assignee: BULL SAS, Les Clayes sous Bois (FR)

( * ) Notice: Subject to any disclaimer, the term of this patent is extended or adjusted under 35 U.S.C. 154(b) by 92 days.

(21) Appl. No.: 18/121,709

(22) Filed: Mar. 15, 2023

(65) Prior Publication Data

US 2023/0297351 A1 Sep. 21, 2023

(51) Int. Cl.
*G06N 10/20* (2022.01)
*G06F 8/41* (2018.01)
*G06N 10/70* (2022.01)

(52) U.S. Cl.
CPC .............. *G06N 10/20* (2022.01); *G06F 8/433* (2013.01); *G06F 8/447* (2013.01); *G06N 10/70* (2022.01)

(58) Field of Classification Search
CPC ......... G06F 8/447; G06F 8/433; G06N 10/20; G06N 10/70
See application file for complete search history.

(56) References Cited

U.S. PATENT DOCUMENTS

2023/0071000 A1* 3/2023 Higgott .................. G06N 10/00

FOREIGN PATENT DOCUMENTS

| EP | 3754565 A1 * | 12/2020 | .......... G06F 11/1068 |
| WO | WO-2022177609 A1 * | 8/2022 | .......... G06F 11/1048 |

OTHER PUBLICATIONS

Zhang et al., "Optimizing T gates in Clifford+T circuit as pi/4 rotations around Paulis", arxiv.org, Cornell University Library, 201 Olin Library Cornell University, Ithaca, NY, 14853, XP081159697, Mar. 29, 2019.

Gheorghiu et al., "A quasi-polynomial time heuristic algorithm for synthesizing T-depth optimal circuits", arxiv.org, Cornell University Library, 201 Olin Library Cornell University, Ithaca, NY 14853, XP081855267, Jan. 8, 2021.

Nam et al., "Automated optimization of large quantum circuits with continuous parameters", npj Quantum Information, pp. 1-12, XP055544356, Jun. 1, 2018.

(Continued)

*Primary Examiner* — Geoffrey R St Leger
(74) *Attorney, Agent, or Firm* — MEAGHER EMANUEL LAKS GOLDBERG & LIAO, LLP

(57) ABSTRACT

A technique for implementing a quantum circuit is provided, where the quantum circuit includes qubits and operators executed on the qubits. The operators include a sequence of π/4 Pauli rotation gates. A surface code layout includes an arrangement of the quantum circuit on a quantum chip, where the arrangement includes at least a tree with a plurality of subtrees, each rotation gate corresponding to a subtree. The technique includes iteratively generating a directed acyclic graph (DAG) of the quantum circuit, where a front layer of the DAG is a set of rotations that can be effectively implemented at each iteration. The technique (Continued)

includes selecting a subset of the rotations (a "selected subset") in the front layer in which the subtrees are arranged not to intersect ("non intersecting subsets").

8 Claims, 6 Drawing Sheets

(56) References Cited

OTHER PUBLICATIONS

Brugiere et al., "Reducing the Depth of Linear Reversible Quantum Circuits", IEEE Transactions on Quantum Engineering, IEEE, vol. 2, pp. 1-22, XP011874279, Jul. 7, 2021.
Litinski, "A Game of Surface Codes: Large-Scale Quantum Computing with Lattice Surgery", arxiv.org, Cornell University Library, 201 Olin Library Cornell University, Ithaca, NY, 14853, XP081255132, Aug. 8, 2018.
Fowler et al., "Surface codes: Towards practical large-scale quantum computation", Physical Review a (Atomic, Molecular, and Optical Physics), vol. 86, No. 3, XP055332246, Oct. 26, 2012.
Babbush et al., "Encoding electronic spectra in quantum circuits with linear T complexity", Physical Review X, vol. 8, No. 4, Oct. 2018.
Beverland et al., "Surface code compilation via edge-disjoint paths", PRX Quantum 3, 020342, arXiv:2110.11493v2, May 25, 2022.
Frank, "Some polynomial algorithms for certain graphs and hypergraphs", Proc., 5th British Combinatiroal Conf., pp. 211-2265, 1975.
Gavril, "The intersection graphs of subtrees in trees are exactly the chordal graphs", Journal of Combinatorial Theory, Series B, vol. 16, No. 1, pp. 47-56, 1974.
Gidney, "How to factor 2048 bit rsa integers in 8 hours using 20 million noisy qubits", Quantum 5, 433, arXiv:1905.09749v3, pp. 1-31, Apr. 13, 2021.
Gidney et al., "Efficient magic state factories with a catalyzed |ccz> -> 2 |T> transformation.", Quantum 3, 1vol. 35, Apr. 26, 2019.
Haah et al., "Codes and protocols for distilling t, controlled-s, and toffoli gates", Quantum 2, vol. 71, Jun. 1, 2018.
Kivlichan et al., "Improved fault-tolerant quantum simulation of condensed-phase correlated electrons via trotterization", Quantum 4, vol. 296, Jul. 10, 2020.
Litinski, "A game of surface codes: Large-Scale Quantum Computing with Lattice Surgery", Quantum 3, vol. 128, 2019.
Litinski, "Magic state distillation: Not as costly as you think", Quantum 3, vol. 205, Dec. 2019.
Wang et al., "Surface code quantum computing with error rates over 1%", arXiv:1009.3686v1, Sep. 20, 2010.
Webber et al., "The impact of hardware specifications on reaching quantum advantage in the fault tolerant regime", arXiv:2108.12371v3, Nov. 12, 2021.
Yoder et al., "The surface code with a twist", Quantum 1, vol. 2, Mar. 20, 2017.

* cited by examiner

COMPILATION TECHNIQUE FOR SURFACE CODE ARCHITECTURE

BACKGROUND

Quantum computing has been developing recently as it gives promising hopes to solve problems that are classically intractable.

One of the challenges that faces quantum computing is that it needs manipulating a large amount of qubits beyond their coherence time, thus requiring error corrections. In particular, to store and manipulate quantum information on large time scales, it is known to actively correct errors by combining physical qubits into logical qubits using a quantum error correcting code such as surface code architecture.

BRIEF SUMMARY

This disclosure ensures an optimization of implementing of the quantum circuit for said surface code architecture.

It is proposed a method for implementing a quantum circuit comprising a plurality of qubits as well as operators executed on said qubits, said operators comprising a sequence of $$\frac{\pi}{4}$$

Pauli rotation gates, a surface code layout comprising an arrangement of said quantum circuit on a quantum chip, the arrangement comprising at least a tree with a plurality of subtrees, at each rotation gate corresponding a subtree of the tree, the method comprising:
- generating iteratively a directed acyclic graph of said quantum circuit, a front layer of the DAG being a set of rotations that can be effectively implemented at each iteration,
- selecting in said front layer of the DAG a subset of said set of rotations in which the subtrees are arranged not to intersect.

Thanks to the claimed method, implementing a given quantum circuit is made with as few time steps as possible.

According to another aspect, the method comprises removing the selected subset of rotations from the DAG.

According to another aspect, the method comprises stopping generating the DAG when the front layer is empty.

According to another aspect, the selected subset is the subset, among the non selecting subsets, that maximizes the number of involved rotations.

According to another aspect, the selected subset is the subset, among the non intersecting subsets, that maximizes the number of involved rotations.

According to another aspect, the method comprises depth first research of the tree to select said selected subset.

According to another aspect, during the depth first research, a given vertex of the tree is visited, a partial solution comprising a set of rotations Ri that we were able to constitute up to the visited vertex and a set of vertices that are still accessible.

According to another aspect, the selected subset is the subset, among the non selecting subsets, that maximizes the involved number of qubits.

According to another aspect, the selected subset is the subset, among the non intersecting subsets, that maximizes the involved number of qubits.

BRIEF DESCRIPTION OF DRAWINGS

Other features, details and advantages will be shown in the following detailed description and on the figures, on which.

DESCRIPTION OF EMBODIMENTS

The present method, referenced 100 in the figures, implements a quantum circuit Qci with as few time steps as possible, i.e., with a high speed process, the number of steps that are required to implement the circuit QCi giving the measure of the process speed.

Figure 1:
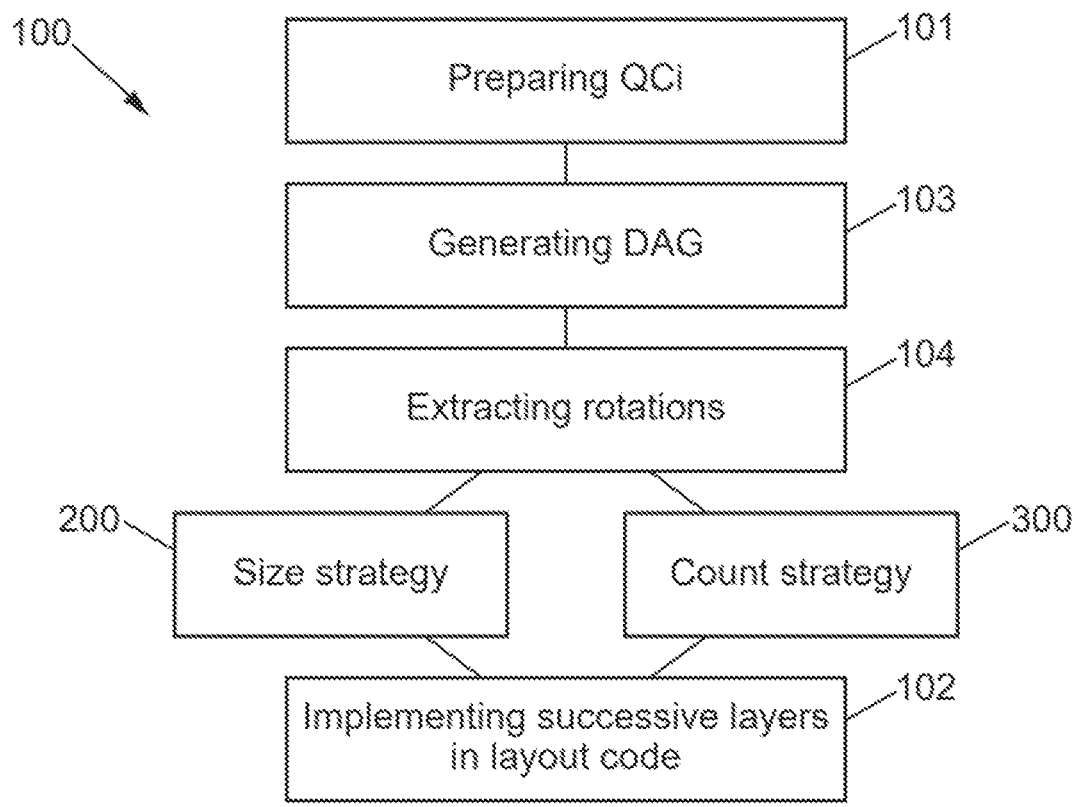
FIG. 1 is a view of a flowchart of a method according to an embodiment.
Figure 2:
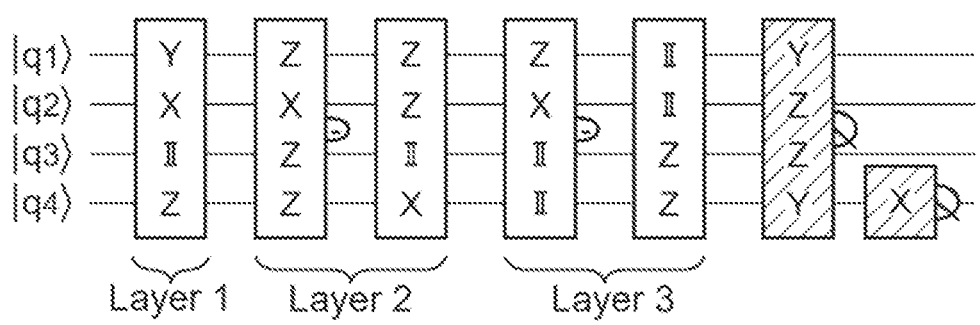
FIG. 2 is a view of an example of a quantum circuit.

As can be seen from FIG. 1, the method 100 comprises a step 101 that prepares the quantum circuit QCi as a sequence of Clifford and T gates (or Pauli π/4 rotation). Preferably, given that the Clifford gates can commute to the end of the circuit, a resulting circuit is of the form of a sequence of a plurality of T gates followed by some Pauli measurements of the qubits. In FIG. 2, the rotations 2 are indicated by layers 1, 2 and 3 while the Pauli joint measurements are indicated by the hatched area.

Figure 3:
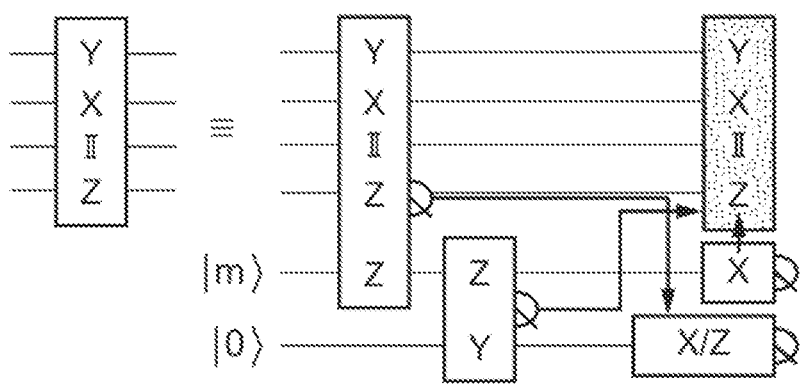
FIG. 3 is a view of an example of a T gate implementation.

The method also comprises a step 102 of implementing the T gates, this step being the costliest step of the method. The step 102 consists in performing a series of joint measurements JM, consuming one magic state, or ancilla, as seen from on FIG. 3, wherein the arrows show that the result of the measurement is used to process a result of the next measurement and the dotted area is a regular Pauli gate. The method can also comprise a step of distillation to produce said magic state. As known, a magic state reads: $|m\rangle = |0\rangle + e^{i\pi/4}|1\rangle$.

Details now are given about how to perform the joint measurements.

Figure 4:
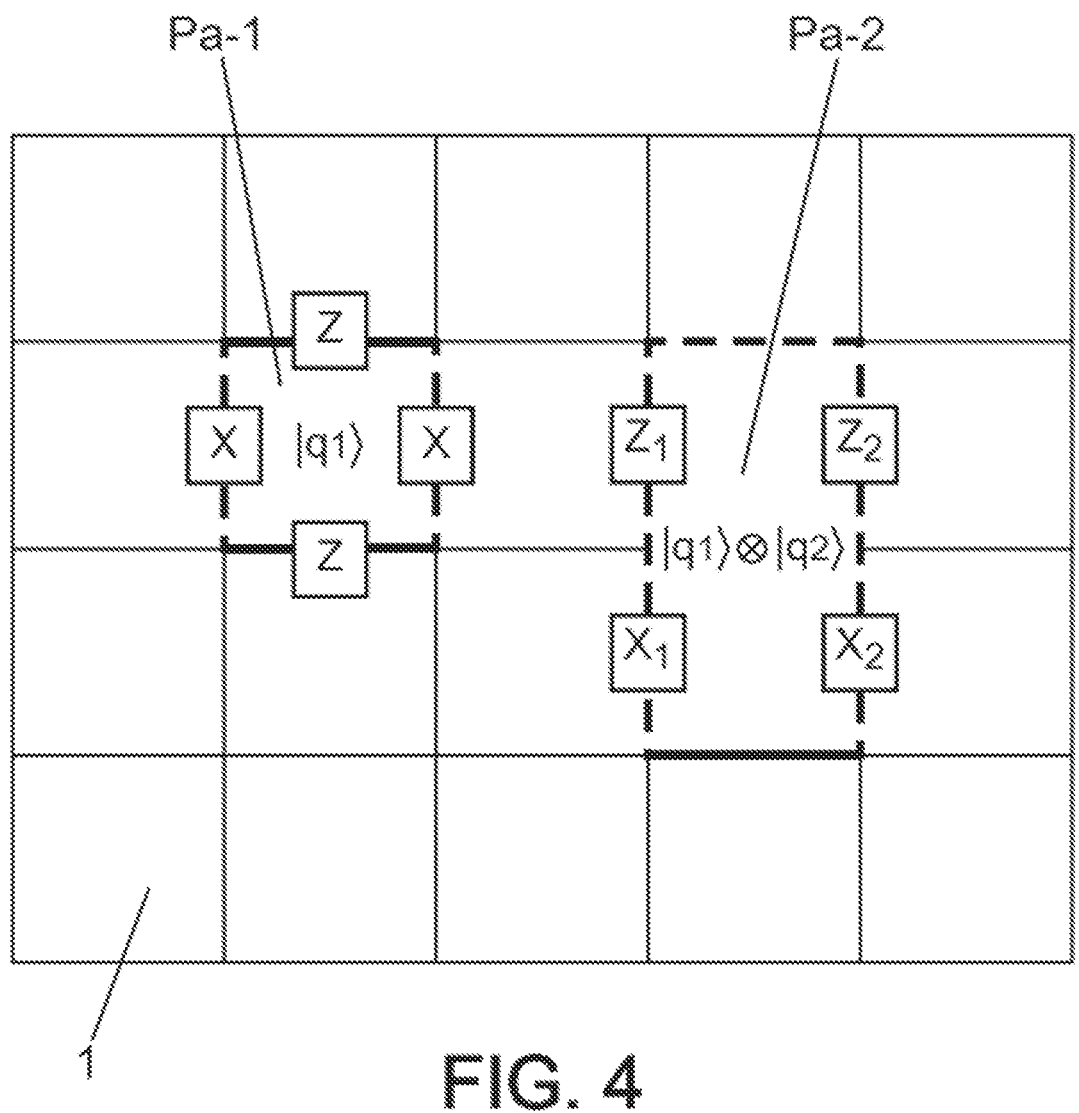
FIG. 4 is a view of a representation of a one-qubit patch and a two-qubit patch.

To do so, the method 100 further comprises encoding the surface code thanks to a plurality of patches Pa. As seen from FIGS. 4 and 5, a board 1 is partitioned into a grid of tiles. The tiles are used to host said patches, each of which tiles being a representation of a qubit. The patches can be either one-qubit or two-qubit patches.

A one-qubit patch Pa-1 represents one qubit and is delimited by four edges, each edge being coupled to a Pauli operator. On FIG. 4, the two dashed edges stand for X operators and the two solid edges stand for Z operators. A two-qubit patch Pa-2 represents two qubits. The two-qubit patch comprises six edges. On FIG. 4, the three dashed lines stand for X operators and the three solid edges stand for Z operators.

Figure 5:
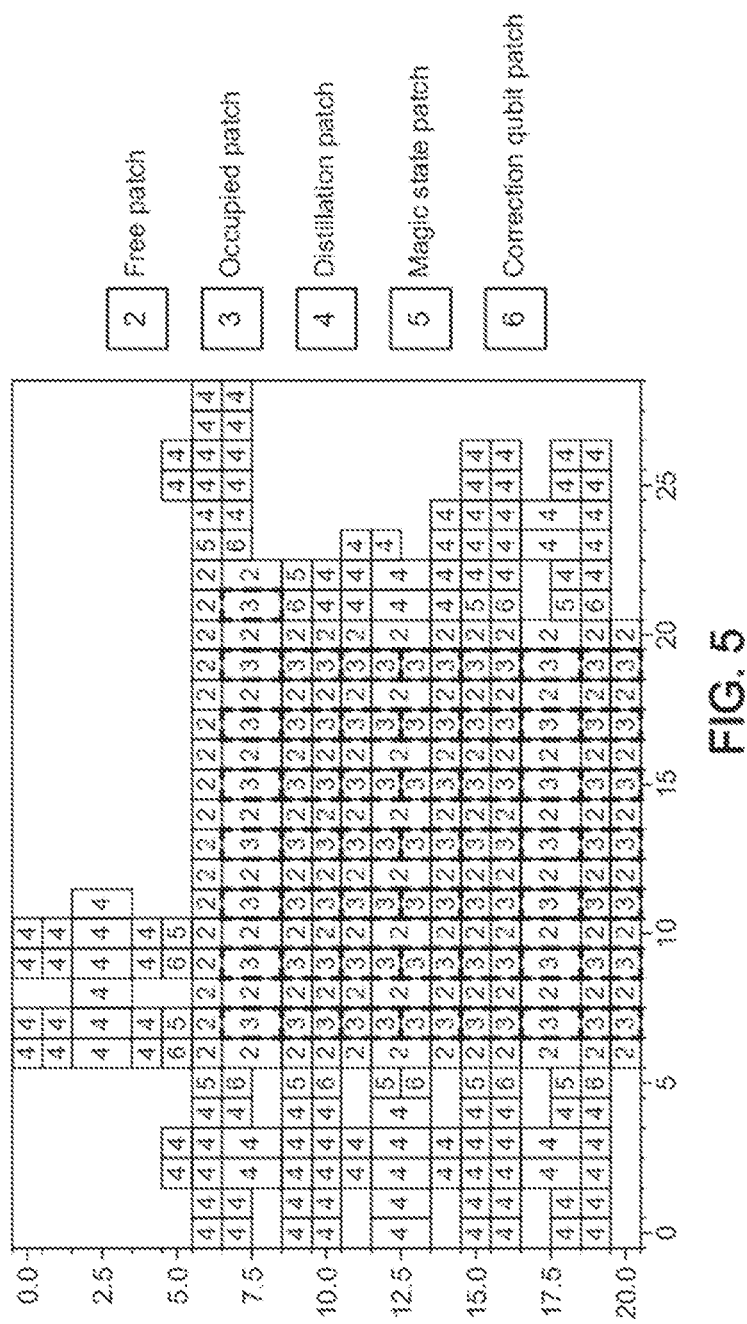
FIG. 5 is a view of a resulting layout.

As shown in FIG. 5, a resulting layout comprises occupied patches 2, free patches 3, distillation patches 4, magic state patches 5 and correction qubit patches 6. Such layout is known from document "A game of surface codes" (2019) by D. Litinsky.

Figures 6, 7:
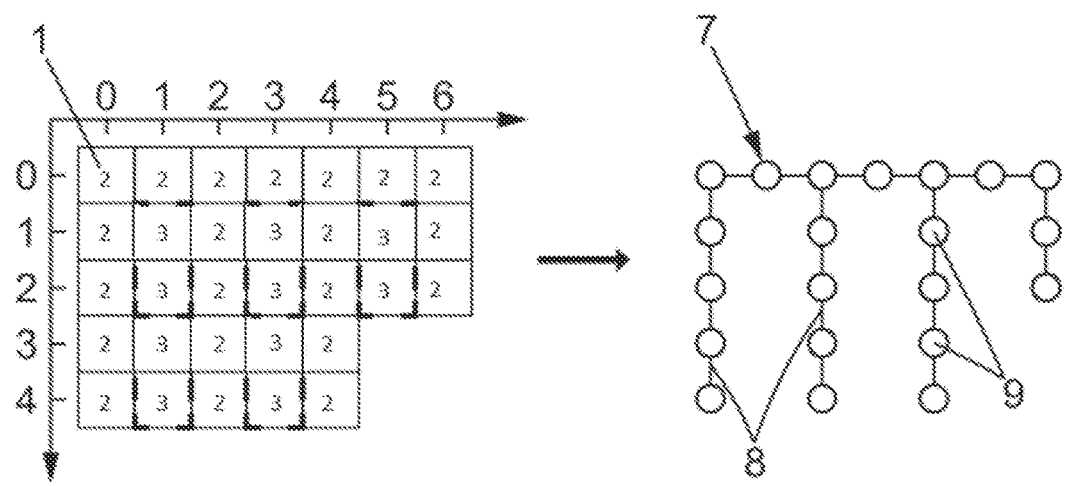
FIG. 6 is a view of an implementation of a joint measurement.
FIG. 7 is a view of a conversion of free tiles layout of FIG. 5 into a tree.

As can be seen from FIG. 6, the joint measurement is implemented by initializing an ancilla patch 5 on free tiles 3 that hits every operator involved in the measurement. On this figure, the Pauli operators that are involved are referenced to as IO (for involved operators) and the ancilla patch is referenced to as AP. Regarding the process speed measure, the joint measurement costs one time step.

The method 100 comprises of converting the free tiles layout into a tree 7. As can be seen from FIG. 7, the tree 7 comprises rods 8 corresponding to the free tiles 3 and nodes 9 corresponding to the information of which gate can be reached. The tree 7 is composed of a plurality of subtrees, some intersecting and some not intersecting. Two subtrees of the graph that do not intersect correspond to two ancillas not intersecting.

The method 100 aims at finding the not intersecting subtrees. Said differently, a subtree spanning all vertices of rotation $R_i$ being noted $\tau(R_i)$, a valid decomposition D reads: $D=\{\tau(R_{i1}), \ldots, \tau(R_{im}) | \forall j \neq k, \tau(R_{ij}) \cap \tau(R_{ik}) = \emptyset\}$.

To construct the valid decomposition D, the method 100 comprises a process 200 referred to as size strategy and/or a process 300 referred to as count strategy. Preferably, the size strategy and the count strategy are alternative steps.

The size strategy consists in selecting the decomposition D that maximizes the number of rotations involved to increase parallelizing of the computation. The count strategy consists in selecting the decomposition D that maximizes the number of qubits involved to increase parallelizing of the computation.

The decomposition that is selected either by the size strategy or the count strategy is called Dsel. The method 100 comprises processes 200, 300 for solving the size and count strategies, as will be detailed later.

The method 100 comprises a preprocess 103 of generating iteratively a directed acyclic graph (DAG) of the quantum circuit Qci.

Figure 8:
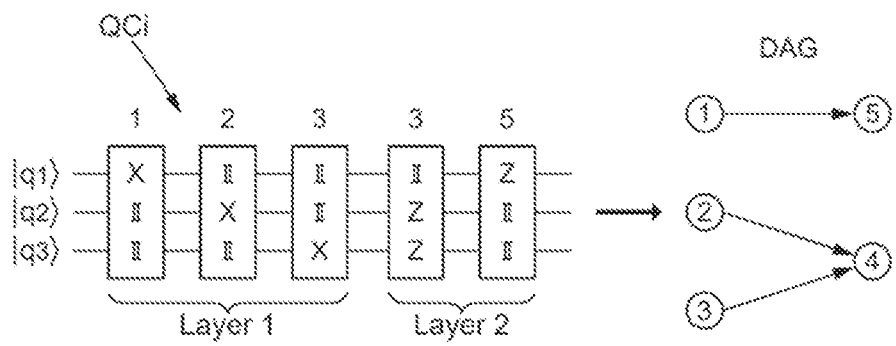
FIG. 8 is view of an example of a directed acyclic graph generated by the method of FIG. 1.

FIG. 8 shows an example of a quantum circuit QCi with the rotations to implement as a DAG. As can be seen, layer 1 comprises T gates 1, 2 and 3 while layer 2 comprises T gates 4 and 5. A link (arrow) symbolizes that rotations 1 and 5 cannot commute, as well as rotations 2 and 3 with 4.

A front layer FL of a given iteration of the DAG can be expressed as the set of rotations that can be effectively implemented in said given step. And, at each iteration, the effectively implemented rotations are removed from the DAG.

As can be seen from FIG. 8, the front layer FL, comprises rotations 1, 2, and 3.

From the front layer FL, rotations among 1, 2 and 3 are to be selected by a heuristic, as will be detailed later in relation with processes 200 and 300. If, firstly, rotations 2 and 3 are implemented in one time step, then the front layer comprises only rotations, or nodes, 1 and 4. Then, rotations 1 and 4 can be implemented in one time step, resulting in the remaining front layer FL of figure that comprises node 5 only.

The method 100 also comprises selecting (step 104) in the front layer FL of the DAG a subset of the set of rotations in which the subtrees are arranged not to intersect. In other words, one can iteratively call the processes 200, 300 on the front layer of the DAG. The rotations chosen by the processes 200, 300 are then removed from the DAG, and the method stops when the DAG is empty.

Thus, the method 100 ensures minimizing the number of time steps that are needed to implement one layer or commuting rotations, by selecting the largest possible group of commuting rotations to implement or the largest possible group of qubits involved.

Chronologically speaking, the step 101 of preparing the quantum circuit QCi precedes generating the DAG (step 103) and extracting (step 104) the rotations that can be implemented, layer by layer, from the DAG as long as the DAG is not empty, as explained above. Then, the T gates are implemented (step 102).

We now detail the size strategy method 200.

The size strategy method is preferably a dynamic recursive method.

The size strategy method 200 proceeds by subdividing the problem into sub-problems and by recombining optimally the solutions to the subproblems into a solution for the initial problem.

The graph, noted G, is a set of points V called vertices or nodes, linked by a set E of edges, such that G=(V, E).

A set R comprises a collection of subsets Ri of vertices of the graph G, R={R1, ..., Rk}, Ri⊆V. The size strategy method applies advantageously to the rotations of the front layer FL of the DAG, though the method 200 is not limited to this application.

The size strategy method comprises a step of visiting the graph G so as to obtain the largest possible collection of m subsets Ri1, ..., Rim∈R such that for all rotations Ri in this collection, there exists an associated tree Ti connecting the vertices of Ri such that these trees are pairwise disjoints ∀i,j, Ti∩Tj=∅.

Figure 9:
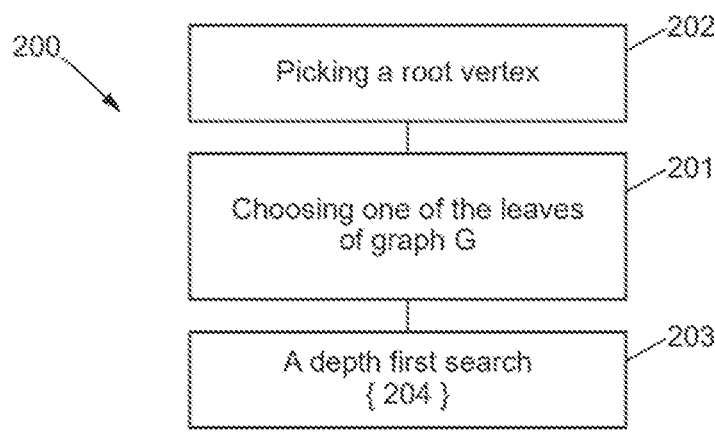
FIG. 9 is a flowchart of a size strategy method of the method of FIG. 1.

G being a tree, the method 200 comprises, as shown in FIG. 9, a starting step 201 of choosing one of the leaves of the graph G, the leaves being vertices that have no child.

The method 200 advantageously comprises a preliminary step 202 of picking a root vertex r∈V (step 302), even though this choice has no influence on the result of the method 200, such that any vertex can be picked. Once this vertex is picked each vertex of G has a single parent vertex and several (possible none) children vertices. The leaves of the tree are the vertices with no child.

Then, the method 200 comprises a depth first search 203 of the tree from the leave that has been selected in step 201. The search 203 comprises visiting all the graph G by visiting all the children of a vertex before visiting said vertex.

Upon visiting a given vertex v of the tree (step 204), a solution, that is partial, is produced, associated to said vertex, using solutions already associated to each of its (already visited) children. These solutions contain two kinds of information, namely a solution set Pv and accessible vertices Mv.

The solution set Pv comprises the rotations Ri that we were able to constitute up to the vertex, meaning all the vertices in the subtree under the vertex, away from the root. And Mv comprises all the vertices that are still accessible, meaning all the vertices that are not part of the solution set Pv and are in between the visited vertex v and the other vertices of the solution set Pv.

Said differently, the collection of the children of the visited vertex v being noted (Pc, Mc), then the solution (Pv, Mv) of step 204 comprises computing the set of accessible vertices Mv={v}∪Mc, computing the solution set Pv=∪Pc, and, updating the solution (Pv, Mv) such that, if Mv contains some rotations that can be implemented Ri, then Mv becomes empty set: Mv←∅ and Pv comprises the preceding solution set Pv as well as the rotations Ri: Pv←Pv∪{Ri}.

Figure 10:
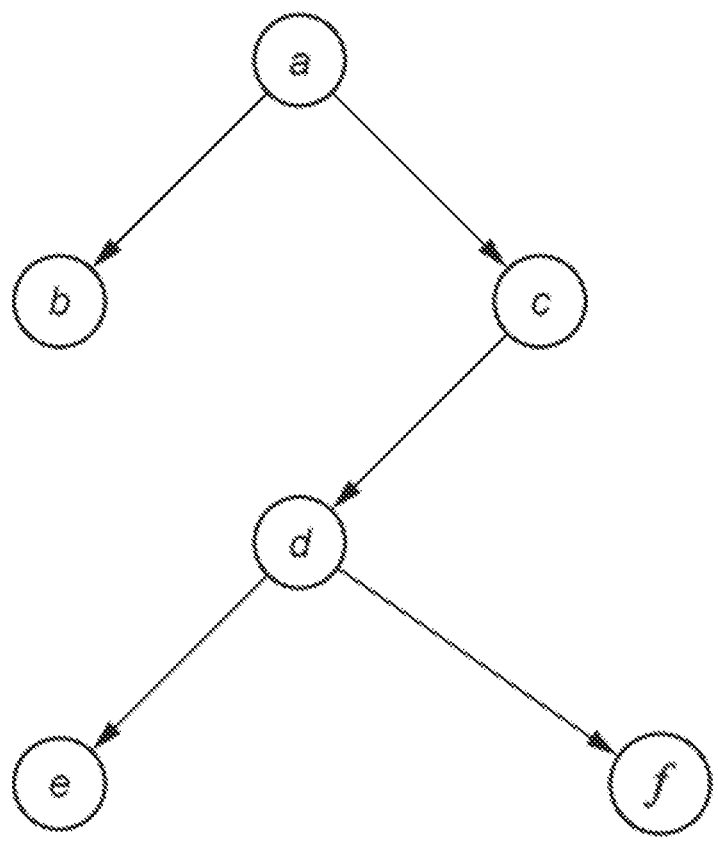
FIG. 10 is an example of a tree on which the size strategy method of FIG. 9 can be applied.

FIG. 10 shows an example of a tree, into which three set are R1={d, e, f}, R2={b,c} and R3={d, f, c}.

The vertex e being a child of the tree, the solution set is (Pe, Me) such that Pe=∅ and Me={e}.

The vertex f being a child, the solution set is (Pf, Mf) such that Pf=∅ and Mf={f}.

For the vertex d, the solution set is (Pd, Md) such that Pd={R1} and Md=∅.

The vertex b being a child of the tree, the solution set is (Pb, Mb) such that Pb=∅ and Mb={b}.

For the vertex c, the solution set is (Pd, Md) such that Pc={R1} and Mc={c}.

For the vertex a, the solution set if (Pa, Ma) such that Pa={R1, R2} and Ma=∅.

The method 200 is optimal, since its result is the largest possible set of subtrees. It is to be noted that the method 200 runs in polynomial time with respect to the size and the number of rotations.

Alternatively, when the graph G has no structure, the method 200 comprises using a heuristic for each Ri in R that contains a Steiner tree Tsi, said Steiner tree comprising a minimal tree that contains all vertices in Ri. Then, the method 200 comprises constructing an intersection graph IG of the Steiner trees, such that the vertices of the graph IG are the trees Tsi, the IG graph comprising an edge between two Steiner trees Tsi, Tsj if they intersect.

The method 200 also comprises finding the largest possible set of vertices of the IG graph that are not pairwise linked by an edge, thanks, preferably, to a maximum independent set problem heuristic solution.

The method 200 is not limited to selecting the rotations from the front layer FL of the DAG.

Indeed, the method 200 can apply to maximizing a number of tasks to be performed in parallel on a calculating cluster with a fixed connectivity. Each Ri stands for one of the resources that is needed to perform the task number i, and the graph G stands for the connectivity of the calculating cluster. In other words, the method 200 ensures minimizing the calculation time, since it indicates which tasks can be performed in parallel without competing on communicating links of the cluster.

We now detail the count strategy method 300.

The graph, noted G, is a set of points V called vertices or nodes, linked by a set E of edges, such that G=(V, E).

A set R comprises a collection of subsets Ri of vertices of the graph G, R={R1, . . . , Rk}, Ri⊆V. The count strategy method applies advantageously to the rotations of the front layer FL of the DAG, though the method 300 is not limited to this application.

The count strategy method comprises visiting the graph G so as to obtain a collection of m subsets Ri1, . . . , Rim∈R such that for all rotations Ri in this collection, there exists an associated tree Ti connecting the vertices of Ri such that these trees are pairwise disjoints ∀i,j, Ti∩Tj=∅ and such that the quantity |Ri1|+|Ri2|+ . . . +|Rim| is maximal. This collection is called count strategy solution.

Preferably, G is a tree.

Figure 11:
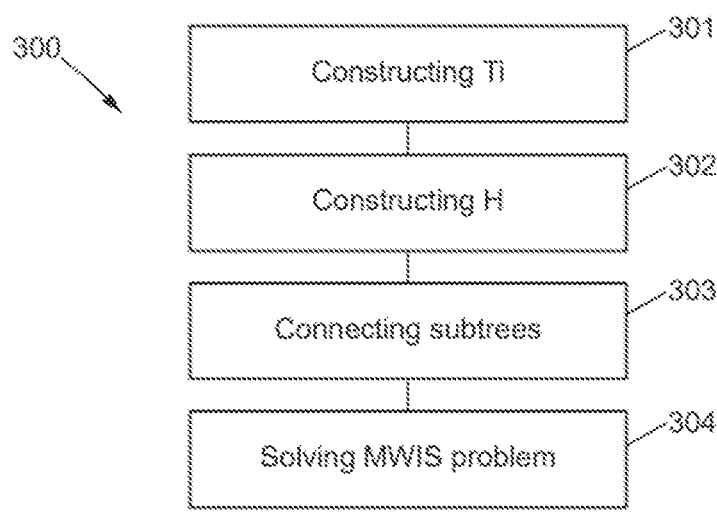
FIG. 11 is a flowchart of a count strategy method of FIG. 1.

Referring to FIG. 11, the count strategy method 300 comprises a first step 301 of constructing a unique minimal tree Ti of the graph G that contains the rotations Ri.

Then, in a second step 302, a new graph H is constructed, whose vertices are the trees Ti. In other words, V(H)= {T1, . . . , Tk}. A weight is associated to each of the vertices of the new graph H. In other words, a weight |Ri| is associated to the tree Ti.

In another step 303, two trees Ti, Tj of the new graph H are connected only if Ti∩Tj≠∅. H being an intersection graph of subtrees of a tree, it is a chordal graph.

Then, the method 300 comprises finding a disconnected set of vertices of H, i.e., a set of non intersecting subtrees, with the largest possible weight, that is, finding a solution to a maximal weighted independent set (MWIS).

To do so, since H is chordal, the method 300 comprises a step 304 of applying Frank's algorithm as known from document "Some polynomial algorithms for certain graphs and hypergraphs", by A. Frank et al., to said MWIS problem. Hence, the result of step 304 is the count strategy solution.

The method 300 is not limited to selecting the rotations from the front layer FL of the DAG. Indeed, the method 300 can apply to maximizing a number of nodes used in parallel in a calculating cluster, which ensures minimizing the calculation time.

What is claimed is:

1. A method for implementing a quantum circuit comprising a plurality of qubits as well as operators executed on said qubits, said operators comprising a sequence of $$\frac{\pi}{4}$$

Pauli rotation gates, a surface code layout comprising an arrangement of said quantum circuit on a quantum chip, the arrangement comprising at least a tree with a plurality of subtrees, each rotation gate corresponding to a subtree of the tree, the method comprising:
  generating iteratively a directed acyclic graph (DAG) of said quantum circuit, a front layer of the DAG being a set of rotations that can be effectively implemented at each iteration;
  selecting in said front layer of the DAG a subset, called a selected subset, of said set of rotations among subsets, called non intersecting subsets, in which the subtrees are arranged not to intersect; and
  implementing said sequence of $$\frac{\pi}{4}$$

Pauli rotation gates in said surface code layout.

2. The method according to claim 1, comprising: removing the selected subset of rotations from the DAG.

3. The method according to claim 1, comprising: stopping generating the DAG when the front layer is empty.

4. The method according to claim 1, wherein the selected subset is the subset, among the non intersecting subsets, that maximizes a number of involved rotations.

5. The method according to claim 4, comprising performing a depth first search of the tree to select said selected subset.

6. The method according to claim 5, wherein, during the depth first search, a given vertex of the tree is visited, wherein a partial solution comprising a set of rotations Ri is constituted up to the visited vertex, a set of vertices being still accessible.

7. The method according to claim 1, wherein the selected subset is the subset, among the non intersecting subsets, that maximizes an involved number of qubits.

8. The method according to claim 1, wherein the method further comprises preparing said quantum circuit.

* * * * *